(12) United States Patent
Shiau et al.

(10) Patent No.: US 6,766,179 B1
(45) Date of Patent: Jul. 20, 2004

(54) CROSS-SHAPE LAYOUT OF CHINESE STROKE LABELS WITH LYRIC

(75) Inventors: Shyue-Chin Shiau, Cupertino, CA (US); Lisa Wong, Fremont, CA (US); Bee Bee Oh, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/412,163

(22) Filed: Oct. 4, 1999

(51) Int. Cl.[7] .................................................. H04M 1/00
(52) U.S. Cl. ..................... 455/566; 455/550.1; 455/73; 341/28; 345/171; 345/467
(58) Field of Search ........................... 707/535; 341/28; 379/110.01; 455/566, 186.2, 67.7, 575, 90, 412.1, 73; 345/171, 168, 467; 704/1, 3; 400/110

(56) References Cited

U.S. PATENT DOCUMENTS

| | | | | |
|---|---|---|---|---|
| 4,603,330 A | * | 7/1986 | Horne et al. ................. | 345/467 |
| 4,684,926 A | * | 8/1987 | Yong-Min ..................... | 341/28 |
| 5,169,342 A | * | 12/1992 | Steele et al. ................. | 434/112 |
| 5,526,411 A | * | 6/1996 | Krieter ................... | 379/110.01 |
| 6,009,444 A | * | 12/1999 | Chen .......................... | 707/535 |
| 6,362,752 B1 | * | 3/2002 | Guo et al. ..................... | 341/22 |

FOREIGN PATENT DOCUMENTS

CN            118085 A     6/1996

OTHER PUBLICATIONS

Patent Abstract of Japan; Application No. 09208057, Date of Publication of Application; Feb. 26, 1999.
Patent Abstract of Japan; Application No. 08164258; Date of Publication of Application: Jan. 16, 1998.
Patent Abstract of China; Application No: CN1208886 A Date of Publication: Feb. 24, 1999.
Patent Abstract of Japan; Application No.: 08164258; Date of Publication of Application: Jun. 25, 1996.
Chinese T9 Text Input's Five–Stroke Text input Method; http//www.tegic.com/chinese/chinesesimplified_fivestroke.html. Aug. 26, 1999; pp. 102.

* cited by examiner

*Primary Examiner*—Sonny Trinh
(74) *Attorney, Agent, or Firm*—Dicran Halajian

(57) ABSTRACT

A layout of five stroke shapes for inputting Chinese characters in a device is disclosed. The layout is Cross-shaped with relative positions of the five strokes being helpful to users knowledgeable in Chinese writing. Further, the layout arrangement is accompanied with a lyric which helps users remember and memorize the locations of the five strokes on the keypad. The relative locations of the five strokes are: Pie at the left of the cross, Dian at the right, Heng at the top, Zhe at the bottom, and Shu at the center. The lyric describes the shapes of the strokes and the relative locations of the strokes in the Cross-shaped configuration. For example, the lyric may be "left slash, right gash, upper over, lower turn with one down in the middle." The lyric may have a tune to become a song and may be burned in a ROM of a device, such as a mobile phone.

13 Claims, 5 Drawing Sheets

左 撇, 右 捺, 上 横, 下 弯, 中间 一 竖
(pie)  (na/dian)  (heng)  (zhe)  (shu)
Left slash. Right gash.  Upper over.  Lower turn.  with one down in the middle

CROSS-SHAPE LAYOUT OF CHINESE STROKE LABELS WITH LYRIC

BACKGROUND OF THE INVENTION

1. Field of the Invention

The present invention is directed to a device and a method to input symbols to form characters and more particularly, to a Cross-shaped layout of strokes on an input device for forming Chinese characters accompanied by a lyric related to the locations of the strokes.

2. Discussion of the Prior Art

It is a difficult task to input Chinese characters into a hand-held device, such as a mobile phone, due to the limited number of keys. There are three popular ways, namely, the Pinyin method which is mainly used in Mainland China; the Zhuyin method which is mainly used in Taiwan area; and the Stroke method which is common in most Chinese-speaking regions.

The stroke method requires the least number of keys and the fewest number of keystrokes. It is based on the structure of Chinese characters, which are composed from components of different stroke shapes. For simplicity, these strokes have been categorized into five groups. Each of the five stroke groups represents several different strokes used to form Chinese characters. There are more than twenty different strokes some of which are disclosed in U.S. Pat. No. 4,684,926, which is incorporated herein by reference.

The five groups are used in mobile phones for Chinese text entry via various software programs, such as the T9 Chinese Text Input technology of Tegic Communication Inc., (Tegic). Each group is represented by a key label an the mobile telephone. The five groups are placed on sequential keys, such as on keys 7, 8, 9, star and 0 of the telephone keypad. There are different methods for identifying and grouping Chinese strokes.

FIG. 1 shows the representative strokes for the five stroke groups arranged on the keypad 10. In particular, the number 7 key 20 is labeled Pie, which is a right to left downward slash, also referred to as a left-sloping stroke; the number 8 key 30 is labeled Shu, which is a vertical bar, also referred to as a vertical stroke; the number 9 key 40 is labeled Na and Dian, where Na is a left to right downward slash, also referred to as a right-sloping stroke, and Dian is a short form of Na; the star * key 50 is labeled Heng, which is a horizontal bar and referred to as a horizontal stroke; and the number zero key 60 is labeled Zhe, which is a combination of the horizontal bar Heng and the slash Pie, also referred to as a turning stroke. In addition, the number # key 70 is labeled with a question mark and is used as a wildcard in case of uncertainty in the proper order of one or more of the five strokes.

To compose a Chinese character, one has to learn the different stroke shapes, the stroke positions and the stroke ordering. The strokes have their relative positions in each Chinese character. The strokes also need to be written in a specific order so that the character can be constructed in a balanced shape. In general, Chinese characters are constructed from left to right and top to bottom.

Forming Chinese characters using more than twenty strokes is difficult and time consuming. This is aggravated by the need to search the keyboard to find the key labeled with the proper stroke. Writing in Chinese using a keyboard is facilitated using software programs that use the five stroke groups.

The Tegic software for a mobile phone, referred to as the T9 software, constructs Chinese characters in response to the five stroke groups. The T9 software displays the strokes entered by the user, and offers Chinese character choices on the display to the user for selection. As the user enters each stroke, the displayed Chinese characters change. The user may select the desired Chinese character as soon as it appears on the telephone display, without finishing the stroke sequence for the character, Although such software greatly facilitates Chinese writing using five keys, the user has no easy way to memorize the mapping of keys with the five stroke groups. Chinese writing related factors have not been considered in the key stroke mapping and the strokes are arbitrarily assigned to the keys. This increases the difficulty of using input devices to construct Chinese characters.

Accordingly, there is a need to enhance Chinese character writing using input devices, to increase the effectiveness of the key-strokes mapping and to increase input efficiency. Further, there is a need to reduce the difficulty in memorizing the mapping of the keys to strokes.

SUMMARY OF THE INVENTION

The object of the present invention is to provide an input device and method that eliminate the problems of conventional input devices and methods of constructing Chinese characters.

Another object of the present invention is to provide an input device and method which enhance the stroke method of writing Chinese characters using software.

A further object of the present invention is to provide an input device and method with a natural mapping of keys to strokes which facilitate the memorization of the mapping of keys and strokes.

The present invention accomplishes the above and other objects by providing a device and method to input characters comprising keys associated with labels or strokes which &re arranged in a Cross-shaped configuration. The relative positions of the strokes on the Cross-shaped configuration are associated with the relative position of the strokes in Chinese characters. Further, the relative positions of the strokes on the Cross-shaped configuration are associated with the shapes of the strokes. Illustratively, the labels are associated with the keys using printed, audio and/or visual means.

In one embodiment, the Cross-shaped layout arrangement is accompanied with a lyric which helps users remember and memorize the locations of the five strokes. The relative locations of the five strokes are: Pie at the left of the cross, Dian at the right, Heng at the top, Zhe at the bottom, and Shu at the center. The lyric describes the shapes of the strokes and the relative position of the strokes in the cross. For example, the lyric may be "left slash, right gash, upper over, lower turn with one down in the middle." The lyric may have a tune to become a song.

The Cross-shaped layout is easily learned and memorized, particularly with the aid of the accompanying lyric. The Cross-shaped layout takes advantage of the users' intrinsic knowledge of the rules of writing Chinese characters. The relative positions among the strokes themselves mirror their relative position within Chinese characters and the Cross-shape layout of the keys optimizes the usability thereof.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which:

FIG. 5 shows a lyric in Chinese and English that describes the relative position of the five strokes according to present invention.

DETAILED DESCRIPTION OF THE INVENTION

Figure 2:
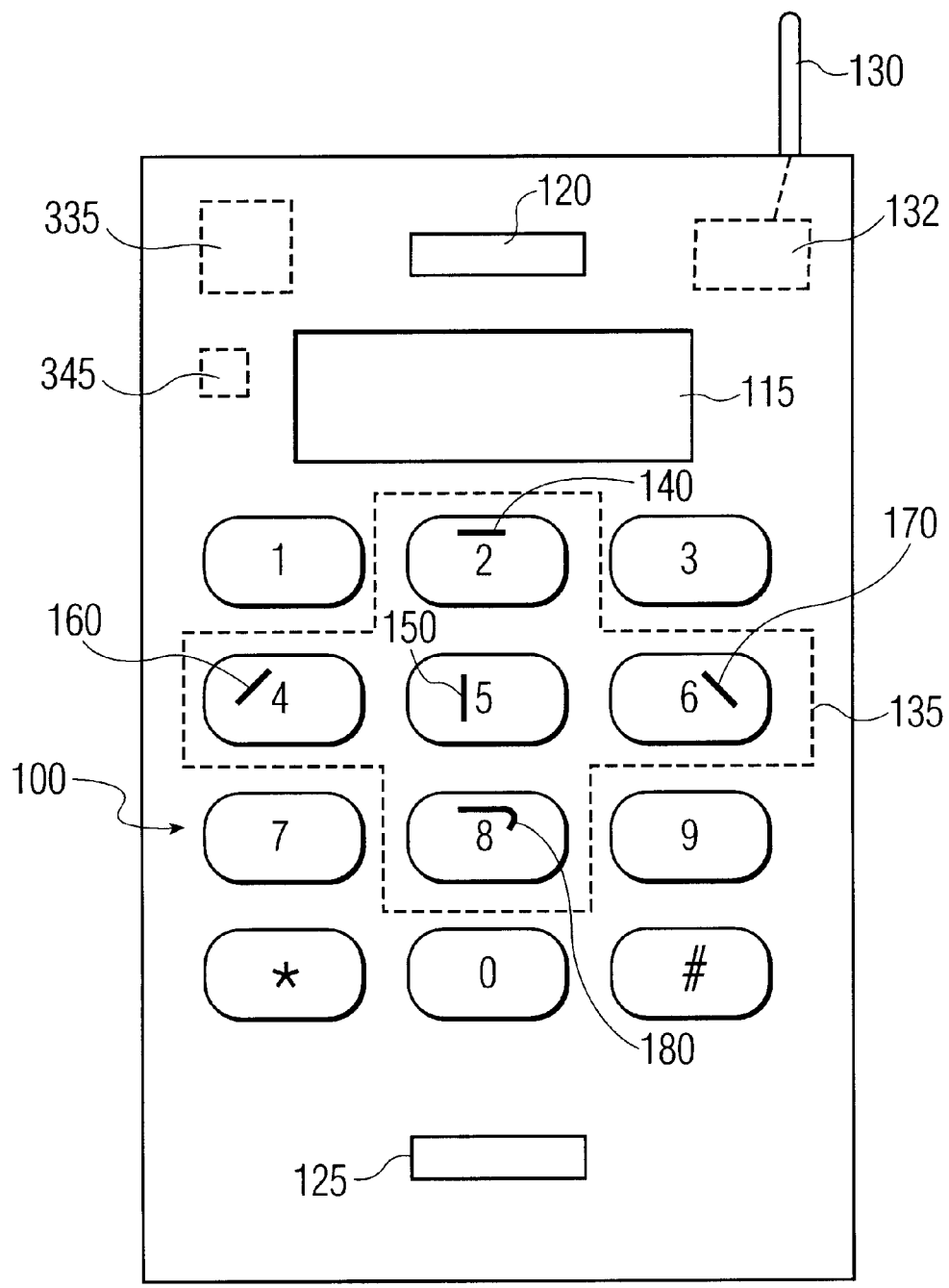
FIG. 2 shows an input device having a Cross-shaped layout for the five strokes according to present invention.

FIG. 2 shows an input device 100, such as a keypad 100 for a communication device like a wireless telephone 110, having a display 115, a speaker 120, a microphone 125 and an antenna 130 connected to a transceiver 132 as is well known in the art. Five keys of the keypad 100 are associated with Chinese strokes, such as via labeling the keys or other printed means such as booklets. Alternatively or in addition to, the five keys of the keypad 100 may be associated with Chinese strokes via audio and/or visual means. For example, the Chinese strokes may be displayed in the Cross-shaped configuration on the display 115, or an audible prompt describing the Cross-shape configuration of the five Chinese strokes may be provided to the user. Illustratively, the audible prompt is stored in a memory 335 of the wireless telephone 110.

The five keys are arranged in a Cross-shape configuration 135. Illustratively, the input device 100 may also be the keyboard of a terminal which may be a personal computer, or a hand held device such as a laptop or palm-size computer, a personal digital assistant or any device having character input means.

Positional relationships to typical Chinese writing styles are optimized to form the Cross-shape layout 135. In particular, the relative positions of the labels or strokes are associated with shapes of the strokes and the relative positions the strokes usually have within Chinese characters. Illustratively, the Cross-shape layout 135 could occupy the keys 2, 4, 5, 6, 8 on a wireless or mobile phone's keypad, as shown in FIG. 2, or any other keys arranged in a Cross-shape, such as using the 5, 7, 8, 9, and 0 keys. The advantage of the Cross-shape is that it is symmetrical, mirroring the fact that most Chinese characters have the same symmetry or balanced shape.

By associating the relative stroke positions with their knowledge of Chinese writing, users can easily remember and learn the stroke keys during character entry. The natural mapping of the key-strokes enables the user to focus more on the strokes and the stroke ordering while less on finding which key to press. This lightens the memory load on the user. Therefore, the efficiency of character input is improved.

As shown in FIG. 2, the Cross-shaped layout includes five strokes, namely:

Heng 140 located at the top of the cross and having the shape of a horizontal bar, i.e., a horizontal stroke;

Shu 150 located at the center of the cross and having the shape of a vertical bar, i.e., a vertical stroke;

Pie 160 located at the left of the cross and having the shape of a right to left downward bar, i.e., left-sloping stroke;

Na 170 located at the right of the cross and having the shape of a left to right downward bar, i.e., right-sloping stroke; and Zhe 180 located at the bottom of the cross and having the shape of a combined horizontal bar Heng 120 and the slant Pie, i.e., turning stroke.

It is noteworthy that a short form of Na 170, referred as Dian, may be used in conjunction with, or in lieu of, Na. Illustratively, the Na 170 key may be used to indicate both Na and Dian in the same key label.

These five strokes are written as follows: To write a Heng 140, the pen needs to move from left to right in horizontal direction; to write a Shu 150, the pen needs to move from top to bottom vertically; to write a Pie 160, the pen need to move from right to left in a down slope angle; to write a Na 170 (or Dian), is the pen need to move from left to right in a down slope angle; and to write a Zhe 180, the pen needs to write a Heng 140 then a left slant Pie 160.

Figure 3A:
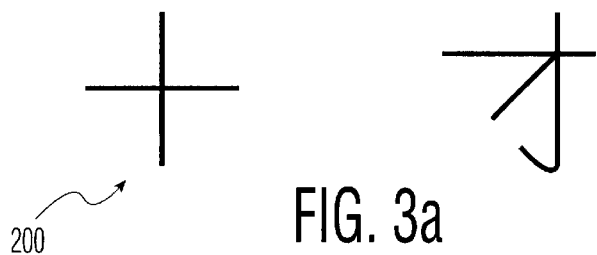
FIGS. 3a–3e illustrate Chinese characters showing the importance of relative positions between the five strokes according to present invention.
Figure 3B:
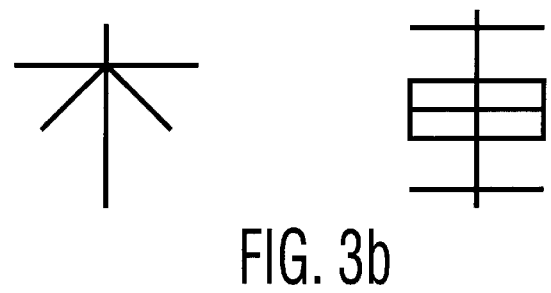
Figure 3C:
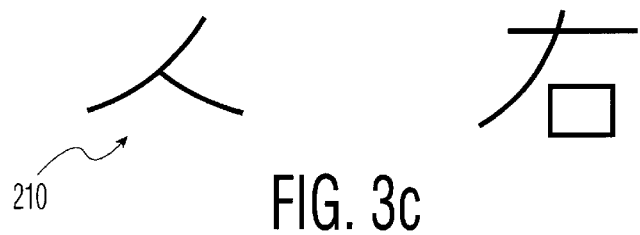

Typically, the Heng 140 is the first stroke for many Chinese characters, as shown in FIG. 3a, where reference numeral 200 is the Chinese character for Ten. The ordering of the strokes in the Chinese character 200 for Ten is a Heng 140 first and then a Shu 150. Shu 150 is used as the middle stroke for many characters, as shown in FIG. 3b. Pie 160 is on the left side of the character in almost every case, as shown in FIG. 3c. Reference numeral 210 in FIG. 3c is the Chinese character for Man, where the ordering of the strokes is Pie 160 and then a Na 170.

Figure 3D:
Figure 3E:
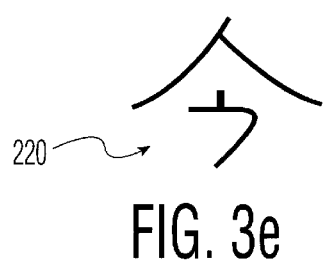

In almost every case, Na 170 is on the right side of the character, as shown in FIG. 3d. Zhe 180 is often located at the bottom position, as shown in FIG. 3e. Reference numeral 220 in FIG. 3e is the Chinese character for Today, where the ordering of the stroke is the following sequence: Pie 160, Na 170, Dian 170 (the short form of Na), and Zhe 180. FIGS. 3a–3e illustrate the importance of the relative positions between these five strokes in typical Chinese characters. The same positional relationships also exist between the other strokes in the five stroke groups.

Figure 4:
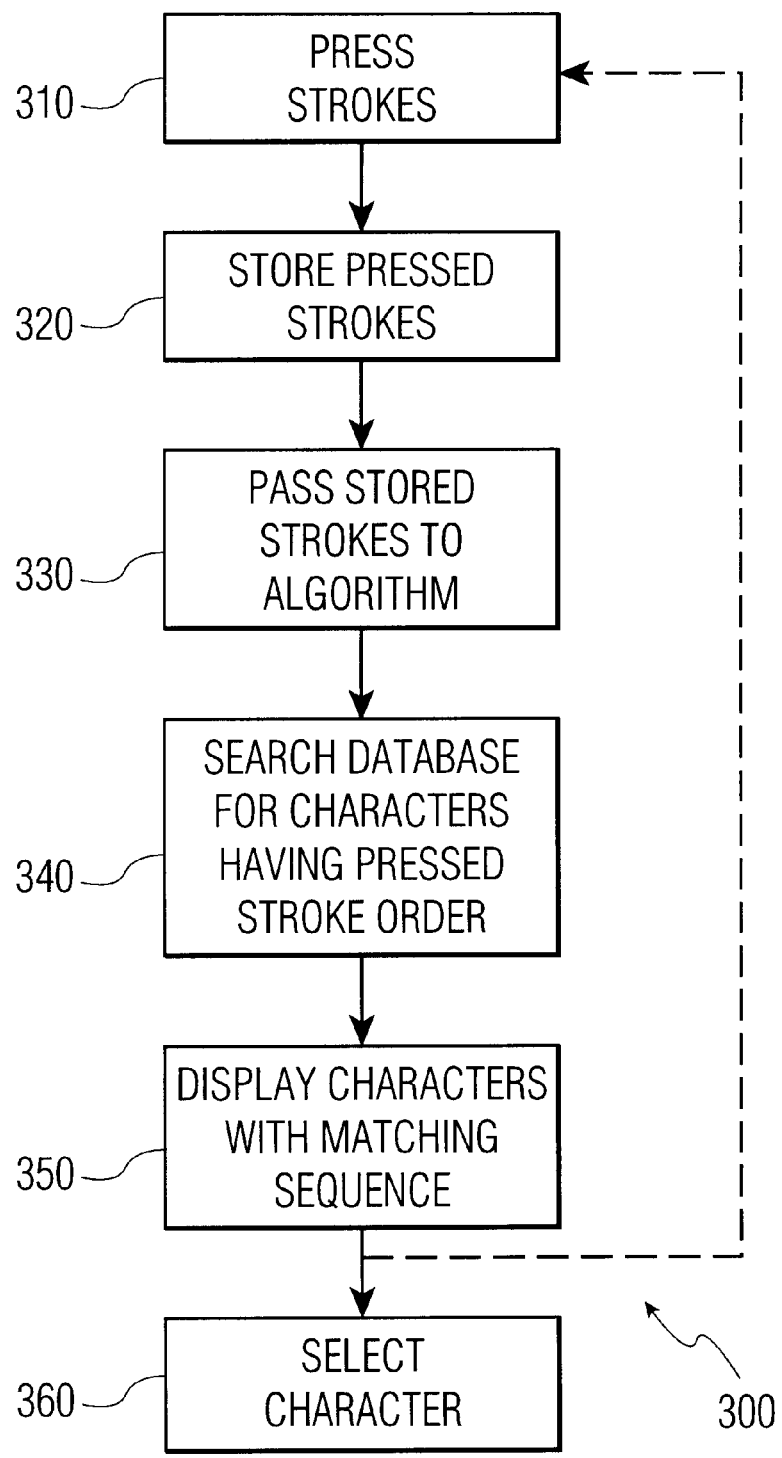
FIG. 4 shows a flow-chart diagram illustrating the Chinese character input process using a device having the Cross-shaped layout according to present invention.

FIG. 4 shows a flow-chart diagram 300 illustrating the Chinese character input process using a device having the Cross-shaped configuration 135 shown in FIG. 2. In step 310, the user presses on the stroke keys of the device having the Cross-shaped configuration 135 in the order corresponding to the stroke writing order for the desired Chinese character. The star and/or pound keys, for example, may be used as wildcards where the proper order or stroke is not known. In step 320, the strokes corresponding to the pressed keys are stored in a memory of the device, such as the memory 335 shown in FIG. 2, or in an input buffer in the software. The pressed strokes may also be displayed on the display 115 shown in FIG. 2, for example.

In step 330, the content of the input buffer is passed to a software algorithm, such as the T9 software algorithm. In step 340, the software performs intelligent search of the Chinese character database for all the characters having the stroke order that matches all the possible stroke sequence represented by the key sequence entered by the user. Illustratively, a microprocessor 345 of the telephone 110 (FIG. 2) performs the search of the database, which may be stored in the memory 335.

In step 350, the characters that match the key sequence will be put on the display buffer as a character candidate list displayed to the user. After step 350, the user either selects a character from the character candidate list in step 360, or returns to step 310 to continue adding to the key sequence to generate more characters on the display.

A lyric is provided to further aid the user in remembering or memorizing the locations of the five stroke keys. The lyric can become a song and stored in the memory 335, such as burned in the ROM, of a device having the keyboard, such as a mobile phone, for end user to play and learn. The lyric describes the relative position of the five strokes and may be the following example, which is also shown in FIG. 5: Left slash (Pie), right gash (Na/Dian), upper over (Heng), lower turn (Zhe), with one down in the middle (Shu).

The Cross-shaped layout with the lyric benefits users who no longer need to worry about which stroke is on which key once they learn the layout. The lyric gives users a better navigation idea and provides an intuitive way to move fingers between keys by reminding the user the strokes and their relative positions in the Cross-shaped configuration.

Furthermore, the Cross-shaped layout of the keys enhances usability of products having an input device, such as a keypad, for writing Chinese characters by providing an easy-to-remember directional relationship between the keys. This directional relationship optimizes the finger movement when navigating between keys during character entry. With key-5 in the middle, for example, the user can easily move the thumb to key-3, key-8, key-4 and key-6 by moving up, down, left and right, respectively.

The directional relationship between keys enables one-hand operation of the device. It also enables the user to perform character-entry without looking at the device.

To facilitate operation without the user looking at the device, the center key can be a bit different from the rest of the keys so that the user knows that it is the middle key by touch. For example, the center key may have a bar or ball which slight protrudes from the key surface. From the middle of the Cross-shape layout, the user can move to any of the four directions easily. For example, the user can move from Shu to Zhe by moving his thumb one key down as indicated in the lyric: Lower turn (Zhe).

The Cross-shaped pattern layout can be used on any product having an input device, such as a keypad, having at least five logical keys. The keys need not be implemented on separate physical keys The keypad can be made of different materials, ranging from the traditional computer hardware keyboard to a touch-screen display, such as liquid crystal display (LCD), where the five logical keys, regardless of shape and material, are positioned in the Cross-shaped manner 105 with respect to one another as shown in FIG. 2.

Figure 1:
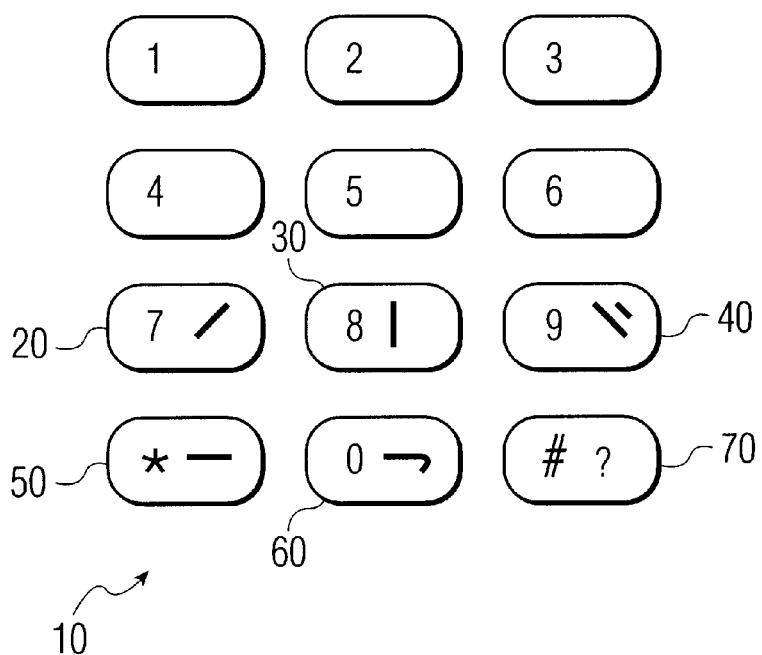
FIG. 1 shows an example of an existing layout for the five strokes used to from Chinese characters.

Devices that can use the Cross-shaped pattern keypad layout 135 (FIG. 1) include two-way pagers as well as mobile and smart phones for writing Chinese text messages. Further, the Cross-shaped pattern keypad layout may be used for entering and/or editing Chinese names in many devices such as phonebook, personal digital assistants or portable/packet-size electronic organizers, or any other product having an input device, and for forming To-Do lists and calendars as well as general word processing. The Cross-shaped pattern keypad layout may be incorporated in any device having a traditional calculator or 10-key numeric keypad for data entry in Chinese.

The Cross-shaped pattern keypad layout 135 may be used with numerous software applications and operating systems including, for example, word processors, To-Do lists and organizers, Email, short message services (SMS), phonebook, Internet browsers, electronic dictionaries and translators, databases and search engines.

With respect to operating systems of computers or hand-held devices such as personal digital assistants (PDAs), users can use the Cross-shape layout keystroke method to save files using Chinese names or to rename icon names, for example. Furthermore, writing Chinese characters using word processors and organizers, as well as for e-mail and SMS application (which is mainly used in mobile phones and two-way pagers), can be done faster and easier with the Cross-shape keystroke input method.

The Cross-shape layout Chinese keystroke and method allow users to perform web searches with Chinese characters. With electronic dictionary or translator software, the Cross-shape layout and method enable Chinese-speaking people to learn about other languages much more easily. The Cross-shape layout and method also allow easy searches on databases in the Chinese language.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

What is claimed is:

1. A device to input characters, comprising:

a plurality of keys with labels, including five keys with labels for representing Chinese characters, said five keys representing five stroke groups of Chinese characters;

said labels being arranged in a cross-shaped configuration that provides a directional relationship between the labels that facilitates operation, said directional relationship enabling a user to navigate among the labels to enter Chinese characters by placing the user's finger on a label at a center Position of said cross-shaped configuration and moving the user's finger in any one of four directions, including up, down, left and right;

said labels including a Pie label located at a left side of said cross-shaped configuration, at least one of a Dian and Na label located at a right position of said cross-shaped configuration, a Zhe label located at a lower position of said cross-shaped configuration, a Shu label located at the center position of said cross-shaped configuration, and a Heng label located at an upper position of said cross-shaped configuration.

2. The device of claim 1, wherein said labels are associated with said plurality of keys using one of printed, audio and visual means.

3. The device of claim 1, further comprising a memory which stores a lyric that describes said five stroke groups of Chinese characters.

4. The device of claim 1, further comprising a memory which stores a tunes and lyric that describes said five stroke groups of Chinese characters and relative positions thereof.

5. The device of claim 1, further comprising a display which displays Chinese characters in response to activation of said plurality of keys.

6. A communication device, comprising:

a transceiver for receiving and transmitting signals; and a keyboard having a plurality of keys with labels, including five keys with labels for representing Chinese characters, said five keys representing five stroke groups of Chinese characters; wherein:

said labels arranged in a cross-shaped configuration that provides a directional relationship between the labels that facilitates operation, said directional relationship enabling a user to navigate among the labels to enter Chinese characters by placing the user's finger on a label at a center position of said cross-shaped configuration and moving the user's finger in any one of four directions, including up, down, left and right; and said labels include a Pie label located at a left side of said cross-shaped configuration, at least one of a Dian and Na label located at a right position of said cross-shaped configuration, a Zhe label located at a lower position of said cross-shaped configuration, a Shu label located at the center position of said cross-shaped configuration, and a Hens label located at an upper position of said cross-shaped configuration.

7. The communication device of claim 6, wherein said labels are strokes for forming Chinese characters.

8. The communication device of claim 6, further comprising a display which displays Chinese characters in response to activation of said plurality of keys.

9. A communication devices, comprising:

a transceiver for receiving and transmitting signals;

a keyboard having a plurality of keys with labels, including five keys with labels for representing Chinese characters, said five keys representing five stroke groups of Chinese characters; wherein:
  said labels arranged in a cross-shaped configuration that provides a directional relationship between the labels that facilitates operation, said directional relationship enabling a user to navigate among the labels to enter Chinese characters by placing the user's finger on a label at a center position of said cross-shaped configuration and moving the user's finger in any one of four directions, including up, down, left and right; and
  said labels include a Pie label located at a left side of said cross-shaped configuration, at least one of a Dian and Na label located at a right position of said cross-shaped configuration, a Zhe label located at a lower position of said cross-shaped configuration, a Shu label located at the center position of said cross-shaped configuration, and a Heng label located at an upper position of said cross-shaped configuration; and
  a memory which stores a lyric that describes said labels.

10. A communication device, comprising:

a transceiver for receiving and transmitting signals;

a keyboard having a plurality of keys with labels, including five keys with labels for representing Chinese characters, said five keys representing five stroke goups of Chinese characters; wherein:
  said labels are arranged in a cross-shaped configuration that provides a directional relationship between the labels that facilitates operation, said directional relationship enabling a user to navigate among the labels to enter Chinese characters by placing the user's finger on a label at a center position of said cross-shaped configuration and moving the user's finger in any one of four directions, including up, down, left and right; and
  said labels include a Pie label located at a left side of said cross-shaped configuration, at least one of a Dian and Na label located at a right position of said cross-shaped configuration, a Zhe label located at a lower position of said cross-shaped configuration, a Shu label located at the center position of said cross-shaped configuration, and a Heng label located at an upper position of said cross-shaped configuration; and
  a memory which stores a tunes and a lyric that describes said labels.

11. A method of forming Chinese characters from at least five strokes, comprising:

entering at least one of said five strokes from an input device having five keys for representing Chinese characters, said five keys representing five stroke groups of the Chinese characters and being arranged in a cross-shaped configuration that provides a directional relationship between the keys that facilitates operation, said directional relationship enabling a user to navigate among the keys to enter Chinese characters by placing the user's finger on a key at a center position of said cross-shaped configuration and moving the user's finger in any one of four directions, including up, down, left and right; and wherein relative positions of said at least five keys are associated with shapes of said strokes, and said keys include a Pie key located at a left side of said cross-shaped configuration, at least one of a Dian and Na key located at a right position of said cross-shaped configuration, a Zhe key located at a lower position of said cross-shaped configuration, a Shu key located at the center position of said cross-shaped configuration, and a Heng key located at an upper position of said cross-shaped configuration;

associating said at least one of said five strokes groups with at least one of said Chinese characters; and providing a lyric that describes said shapes.

12. The method of claim 11, further comprising displaying said Chinese characters and selecting a desired a Chinese character from a plurality of said Chinese characters.

13. A device to input characters, comprising:

a transceiver for receiving and transmitting signals;

a keyboard having a plurality of keys with labels, including five keys with labels for representing Chinese characters, said five keys representing five stroke groups of Chinese characters; wherein:
  said labels are arranged in a cross-shaped configuration that provides a directional relationship between the labels that facilitates operation, said directional relationship enabling a user to navigate among the labels to enter Chinese characters by placing the user's finger on a label at a center position of said cross-shaped configuration and moving the user's finger in any one of four directions, including up, down, left and right; and
  said labels include a Pie label located at a left side of said cross-shaped configuration, at least one of a Dian and Na label located at a right position of said cross-shaped configuration, a Zhe label located at a lower position of said cross-shaped configuration, a Shu label located at the center position of said cross-shaped configuration, and a Hen& label located at an upper position of said cross-shaped configuration; and
  a memory which stores a lyric that describes said labels.

* * * * *